Patented July 28, 1942

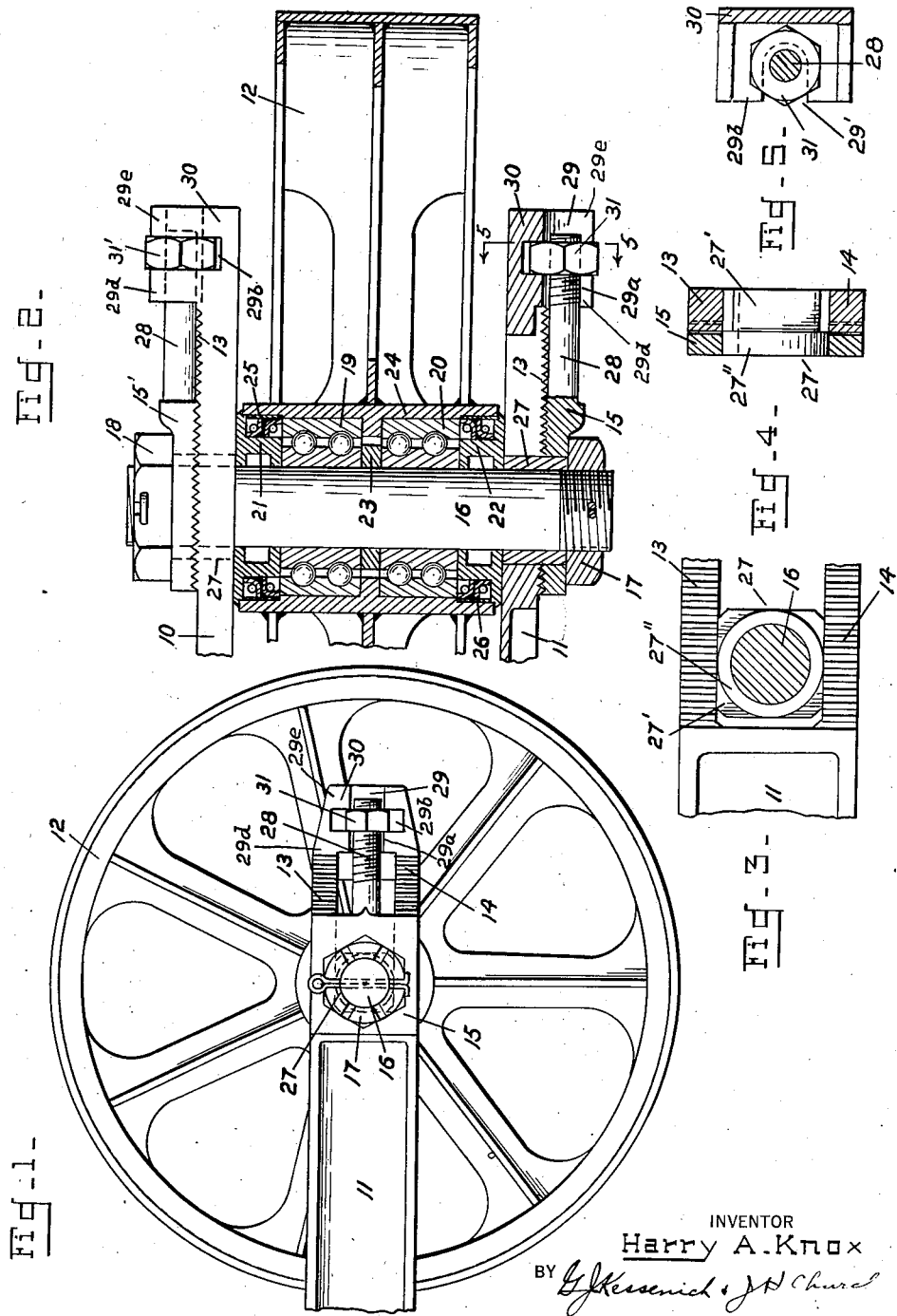

2,290,883

UNITED STATES PATENT OFFICE 2,290,883

ADJUSTABLE IDLER WHEEL

Harry A. Knox, Washington, D. C.

Application June 7, 1941, Serial No. 397,127

10 Claims. (Cl. 308—18)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to an adjustable idler wheel for a track-laying vehicle and an adjusting mechanism for the wheel.

An object of my invention is to provide an idler wheel which may be adjusted so as to take up the slack in a track on a track-laying vehicle.

Another object of my invention is to provide an adjusting mechanism and adjustable clamping means for the bearing of a rotatable wheel so that the bearing may be displaced and held in a locked position at a plurality of points which lie on a line perpendicular to the axis of the bearing.

The nature and further objects of my invention will appear from the following description and drawing, and my invention is pointed out in particularity in the appended claims. My invention resides in the novel arrangement and combination of elements necessary to produce an adjustable clamp for a wheel bearing of the type hereinafter described and claimed, it being understood that changes in the precise embodiment of the invention herein disclosed may be made within the scope of what is claimed without departing from the spirit of the invention.

Fig. 1 is a side view of the wheel showing the bearing clamping means in place.

Fig. 2 is a plan view, partly in section, of the bearing clamping means.

Fig. 3 discloses the flat portions 27' on the bushings 27 in abutting relationship to the inner surfaces of the members 13 and 14.

Fig. 4 discloses a sectional view of the bushing 27 in abutting relationship to members 13, 14 and washer 15.

Fig. 5 is a view taken on line 5—5 of Fig. 2.

Referring to the drawing, the numerals 10, 11 designate the forked portions of a suspension in which a rotatable member or wheel 12 is mounted. The member 11 has two spaced elements 13 and 14 between which one end of the wheel bearing is disposed. An identical structure is made of avail in mounting the other end of the bearing. The elements 13 and 14 have exposed surfaces which are notched so as to cooperate with the notched surface on washer 15. The notches may take the form of a plurality of triangular shaped grooves as indicated in the drawing, or circular grooves or a series of displaced lugs and the term "notched surfaces" is to be interpreted broadly to include those arrangements as well as other arrangements readily apparent to one skilled in the art. Also, only one of the elements 13, 14 need have a notched surface in order that my invention may be practiced although it is preferable to have both of the surfaces notched.

A shaft 16 extends between the members 10 and 11 and is adapted to take nuts or similar clamping means 17, 18 and associated cotter pins on its opposite ends. The wheel 12 is rotatable on the ball bearings 19 and 20, and it is understood that the ball bearings 19 and 20 may be formed as one unit if desired. Spacers 21, 22 and 23 serve to hold the wheel 12 in aligned position, and the spacers 21, 22 have annular grooves which cooperate with the hub 24 of wheel 12 to form a housing for the retaining rings 25, 26. Bushings 27 are disposed on opposite ends of the shaft and one of the bushings abuts the spacer 21 and nut 18 and the other bushing abuts the spacer 22 and nut 17 so that when the nuts 17 and 18 are tightened the shaft 16 and the members abutting the shaft are prevented from rotating. The bushings 27 are formed with circular and non-circular sections so as to conform with the apertures through which they pass. The bushing 27 has as shown in Figs. 3 and 4 a non-circular section 27' and a round section 27''. The section 27' is adapted to conform to the inside surfaces of members 13, 14 so that the bushing 27 may slide between the members 13 and 14 during the adjusting operation and also provide more than a line contact for the transmission of stresses. The non-circular section 27' may take the form of a hexagon or square or other multisided figure so long as it provides sliding surfaces against the members 13 and 14 and also provides more than a line contact between those members.

The washer 15 has formed integral therewith a bolt 28 which is adapted to be movable through the axially disposed hollow portions or holes 29, 29a in a pair of projections 29d, 29e of the extension 30 on member 11. Endpiece or extension 30 joins the branches 13, 14 of the fork 11 as seen in Figs. 1 and 5. A nut 31 on bolt 28 is disposed in orifice 29b which is between the axially disposed holes 29, 29a or projections 29d, 29e, and the metal walls of the two holes 29, 29a or projections 29d, 29e are spaced to allow a limited amount of axial movement of the nut. Rotation of nut 31 in either direction produces axial movement of the washer 15.

In order to adjust the wheel 12 on the members 10 and 11 the procedure is as follows:

1. Release nuts or clamping means 17 and 18 so as to allow the washer 15 and 15' to be disengaged from the notched surfaces on member 10, 11.

2. Rotate nuts 31 and 31' to such a degree and in such a direction until the wheel 12 assumes the desired position.

3. Tighten bolts 17 and 18.

Upon removal of the nut 17, the washer 15 and associated bolt 28 may be moved lateral to the bolt axis and parallel to the axis of the axle 16 since as disclosed in Fig. 5 the hollow portions 29 have openings 29' (Fig. 5) through which the bolt 28 may move laterally. This feature allows rapid assembly and disassembly of the idler wheel.

I claim:

1. Adjusting mechanism for a clamp comprising two spaced members disposed in parallel relationship, an endpiece joining said members at one of their ends, a shaft disposed in the space defined by the two spaced members with the shaft axis perpendicular to the direction in which the parallel members extend, a washer on the shaft and adapted to span the spaced members and cooperate therewith, said endpiece having two spaced projections with coaxial hollow portions having their axes parallel to the direction of said spaced members, a threaded bolt rigidly attached to said washer and extending through the coaxial hollow portions, a nut threaded on the bolt and disposed between the two spaced endpiece projections, said nut having a thickness somewhat less than the spacing of the endpiece projections, and said spaced endpiece projections having openings therein so as to allow lateral movement of the bolt out of the coaxial hollow portions.

2. Adjusting mechanism for a wheel shaft comprising a pair of forked members disposed in parallel planes, said shaft being arranged with its axis perpendicular to the planes of the two forked members and its ends movable within the space defined by the prongs of the forked members, bearings mounted on said shaft, spacers abutting the bearings, threaded portions on the ends of the shaft, clamping means on the threaded portions, bushings on said shaft abutting said spacers and said clamping means, washers on the ends of the shaft and abutting the outside surfaces of the forked members and the inside surfaces of said clamping means, two spaced projections on each one of the forked members, said projections having coaxial hollow portions with their axes parallel to the planes of said forked members, threaded bolts rigidly attached to said washers and extending through the coaxial hollow portions and a nut on each bolt disposed between the spaced projections, said nut having a thickness somewhat less than the spacing of the projection.

3. Adjusting mechanism for a wheel shaft comprising a pair of forked members disposed in parallel planes, said shaft being arranged with its axis perpendicular to the planes of the two forked members and its ends movable within the space defined by the prongs of the forked members, threaded portions on the ends of the shaft, clamping means on the threaded portions, washers on the ends of the shaft abutting the outside surfaces of the forked members and the inside surfaces of said clamping means, bearings mounted on said shaft, spacers abutting the bearings, bushings on said shaft and passing through said washers and abutting said spacers and said nuts, said bushings having flat surfaces engaging the inner surfaces of the forked members and a cylindrical surface engaging the inner cylindrical surface of the washer, two projections on each one of the forked members, said projections having coaxial hollow portions with their axes parallel to the planes of said forked members, threaded bolts rigidly attached to said washers and extending through the coaxial hollow portions and a nut on each bolt disposed between the spaced projections, said nut having a thickness somewhat less than the spacing of the projections.

4. The same as in claim 2 and the bushing has a substantially rectangular section adapted to cooperate with the inner guide surfaces of the spaced members so as to form a guide.

5. The same as in claim 1 and a guide between the shaft and spaced members, said guide comprises: a bushing on the shaft and having a substantially rectangular section adapted to cooperate with the inner surfaces of the spaced members.

6. The same as in claim 2 and said spaced projections have openings therein so as to allow lateral movement of the bolt out of the coaxial hollow portions in the projections.

7. The same as in claim 3 and said spaced projections have openings therein so as to allow lateral movement of the bolt out of the coaxial hollow portions in the projections.

8. Adjusting mechanism for a clamp comprising two spaced members disposed in parallel relationship, an endpiece joining said members at one of their ends, a shaft disposed in the space defined by the two spaced members with the shaft axis perpendicular to the direction in which the parallel members extend, a washer on the shaft and adapted to span the two spaced members and cooperate therewith, said endpiece having at least one projection with a hollow portion having its axis parallel to the direction of said spaced members, a threaded bolt rigidly attached to said washer and extending through the hollow portion, a nut threaded on the bolt and adapted to abut the projection whereby axial movement of the bolt is produced upon rotation of the nut, and said projection has an opening therein for the radial movement of the bolt whereby the bolt may be separated from the projection.

9. Adjusting mechanism for a wheel shaft comprising a pair of forked members disposed in parallel planes, said shaft being arranged with its axis perpendicular to the planes of the two forked members and its ends movable within the space defined by the prongs of the forked members, washers on the ends of the shaft and abutting the outside surfaces of the forked members, a projection on at least one of the forked members and having a hollow portion therein with its axis parallel to said planes, a threaded bolt on at least one of the washers and extending through said hollow portion, a nut threaded on the bolt and adapted to abut said projection whereby axial movement of the bolt is produced upon rotating the nut, means on the ends of the shaft for clamping the washers to the outside surfaces of the forked members, and said projection has an opening therein for the radial movement of the bolt whereby the bolt may be separated from the projection.

10. Adjusting mechanism for a clamp comprising two spaced members disposed in parallel relationship, an end piece joining said members at one of their ends, a shaft disposed in the space defined by the two spaced members with the shaft axis perpendicular to the direction in which the parallel members extend, a notched surface on at least one of said members, a washer on the shaft and adapted to span the two spaced members and having a notched surface which abuts the notched surface on said member, said end piece having two spaced projections with coaxial hollow portions having their axes parallel to the direction of said spaced members, a threaded bolt rigidly attached to said washer and extending through the hollow portions, a nut threaded on the bolt and disposed between the two spaced projections, said nut having a thickness somewhat less than the spacing of the end piece projections, a guide between the shaft and spaced members, said guide comprises: a bushing on the shaft and having a substantially rectangular section adapted to cooperate with the inner surfaces of the spaced members.

HARRY A. KNOX.